United States Patent [19]
Fukuda et al.

[11] Patent Number: 6,031,796
[45] Date of Patent: Feb. 29, 2000

[54] OPTICAL DISK APPARATUS

[75] Inventors: Misao Fukuda; Takayuki Masuda, both of Tokyo; Keishi Ueno, Hanno; Akira Mashimo, Tokorozawa, all of Japan

[73] Assignees: NEC Corporation; Teac Corporation, both of Tokyo, Japan

[21] Appl. No.: 09/021,689

[22] Filed: Feb. 10, 1998

[30] Foreign Application Priority Data

Feb. 12, 1997 [JP] Japan ..................................... 9-028095

[51] Int. Cl.⁷ ....................................................... G11B 7/00
[52] U.S. Cl. .................................. 369/32; 369/47; 369/50; 369/59
[58] Field of Search ................................. 369/47, 48, 49, 369/50, 53, 54, 58, 59, 60, 32; 360/48, 51, 53, 49, 50

[56] References Cited

U.S. PATENT DOCUMENTS 5,559,765  9/1996  Andou ........................................ 369/32
5,825,736  10/1998  Kimura et al. ............................ 369/59
5,848,040  12/1998  Tanaka ....................................... 369/59

*Primary Examiner*—Muhammad Edun
*Attorney, Agent, or Firm*—Ladas & Parry

[57] ABSTRACT

An optical disk apparatus for performing recording and reproduction of information on an optical disk is disclosed. The optical disk has a sector format which consists of a sector mark area in which a sector mark is recorded and an address area in which a plurality of VFO segments and ID segments are alternately provided. The apparatus comprises a sector mark detector, a read gate controller, a PLL controller and an address information detector. The sector mark detector detects the sector mark. The read gate controller controls a read gate to be opened and closed. The read gate enables readout of information from the VFO segment when it is opened. The PLL controller initiates synchronization of a signal read from the VFO segment with a PLL in response to the opening of the read gate. The address information detector detects an address identifier recorded in the ID segment. If the address information detector cannot detect the address identifier, the read gate controller closes the read gate and opens the read gate at a timing corresponding to the VFO segment located immediately after the ID segment in which the address identifier cannot be detected.

5 Claims, 5 Drawing Sheets

OPTICAL DISK APPARATUS

BACKGROUND OF THE INVENTION

1. Field of the Invention

The present invention generally relates to optical disk apparatuses, and more particularly to an optical disk apparatus which performs recording and reproduction of data or information on an optical disk having duplicate address identifiers recorded on a sector thereof.

2. Description of the Related Art

Memory media in the form of disks which are replayed by means of laser pickups of optical disk apparatuses are generally used as memory media which store information such as data bases and computer programs. The optical apparatuses include "read only type" apparatuses which can only read out information recorded on disks such as CDs (compact discs) and CD-ROMs, and "read and write type" apparatuses which can also write information on disks. The "read and write type" apparatuses include "write-once type" apparatuses (CD-R) which can write information only once and "erasable type" apparatuses which can write information any number of times such as magneto-optic disk (MO) apparatuses and phase change type disk (PD, CD-RW) apparatuses.

Since the conventional optical disk apparatuses are dedicated to any one of the above types of disks, it is necessary to have a plurality of optical disk apparatuses to replay the various types of disks. In order to avoid such an inconvenience, optical disk apparatuses have been developed which can replay different types of disks. One of such conventional optical disk apparatuses is an apparatus which has a disk cartridge mounted thereon containing CD-ROMs and PD disks.

Such optical disk apparatuses which can be used for both CD-ROMS and PD disks generally consist of an optical head, an optical system control part, a CD system signal processing part, a PD system signal processing part, and a motor driver. The optical head reads out information recorded on a disk or writes information on the disk. The optical system control part performs focus and tracking control of the optical head, drives a laser diode and controls the output power thereof.

Data is recorded with a predetermined format on tracks which are concentrically provided on the optical disk. Each track is circumferentially divided into a plurality of sectors, each of which has a recording area. Each sector is assigned a unique address which is previously recorded on an address area located immediately before the recording area.

FIG. 1 is a diagram illustrating the timing of opening of a read gate in relation to a format of the address area. Each address of each sector has a sector mark area 1 and an ID area 2 at a location immediately before the recording area. The sector mark area 1 contains a sector mark (SM) for identifying a start location of the sector. The ID area 2 has VFO segments in which readout synchronous signals (VFOs) are recorded and ID segments in which an address identifier (ID) indicating the location of the sector is recorded.

When the sector mark (SM) recorded in the sector mark area 1 is read by the optical head, the read gate is opened. Then the readout synchronous signal (VFO) is brought into synchronization with a phase-locked loop (PLL) and an output signal whose phase is synchronized with a frequency modulated carrier is generated. In this phase-locked situation, the sector is in a readable state and thus the address identifier (ID) is read from the ID area 2.

In the case of a conventional optical disk, three VFO segments and three ID segments are alternately provided. In a read mode, if any one of the three address identifiers (ID1 through ID3) has been read, then data can be read from the recording areas. In a write mode, if at least two of the three address identifiers (ID1 through ID3) have been read, then data can be written to the recording area.

Hence, even if the first address identifier (ID1) can not be read, for example, it is possible to identify the location of the sector by reading the second readout synchronous signal (VFO2), the second address identifier (ID2), the third readout synchronous signal (VFO3), and the third address identifier (ID3).

As described above, when the sector mark (SM) has been read, the read gate is opened so that the first readout synchronous signal (VFO1) is brought into synchronization with the phase-locked loop (PLL). However, if the first readout synchronous signal (VFO1) cannot be read due to some defect in the first VFO segment, it is impossible to achieve the synchronization. Therefore, the address identifiers (ID1 through ID3) cannot be read out even if there is no defect in the second and third VFO segments. In this case, a number of attempts will be made to read the address identifier but in vain, and as a result, the corresponding sector is registered as a defective sector because the location thereof cannot be detected. Thus, the sector can no longer be used and the storage capacity of the optical disk is reduced.

SUMMARY OF THE INVENTION

Therefore the object of the present invention is to provide an optical disk apparatus which can obviate the above problems.

The above object of the present invention is achieved by an optical disk apparatus for performing recording and reproduction of information on an optical disk having a sector format which consists of a sector mark area in which a sector mark is recorded and an address area in which a plurality of VFO segments and ID segments are alternately provided, comprising: a sector mark detector which detects the sector mark; a read gate controller which controls a read gate to be opened and closed, the read gate enabling readout of information from the VFO segment when the read gate is opened; a PLL controller which initiates synchronization of a signal read from the VFO segment with a PLL in response to the opening of the read gate; and an address information detector which detects an address identifier recorded in the ID segment, and wherein, if the address information detector cannot detect the address identifier, the read gate controller closes the read gate and opens the read gate at a timing corresponding to the VFO segment located immediately after the ID segment in which the address identifier cannot be detected.

Hence, if the address identifier cannot be read from the first ID segment, for example, it is possible to open the read gate during a period corresponding to the second VFO segment so that the address identifier can be read from the second or later ID segment to identify the address of the corresponding sector. Consequently, even if signals cannot be read from the first VFO segment due to some defect which has occurred therein, the sector can be used and, as a result, the storage capacity of the optical disk is not reduced because the sector is not regarded as a defective sector.

The read gate controller may begin to control the read gate after the segment mark has been detected. Hence, the address identifier can be read sequentially from the first one of the plurality of the ID segments.

The address information detector may include an ID window controller which opens an ID window during a period corresponding to the ID segment of the address area, the ID window enabling the detection of the address identifier recorded in the ID segment when the ID window is opened. Hence, the address identifiers can be correctly read from the respective ID segments.

The read gate controller may close the read gate in response to the closing edge of the ID window. Hence, the ID window can be opened in correspondence with the next ID segment. Consequently, if the address identifier cannot be detected in the first ID segment, it is possible to correctly read the address identifier from the next ID segment.

The address area may comprise at least three pairs of mutually adjacent VFO segments and ID segments. Hence, even if the address identifier cannot be read from the first ID segment due to some defect in the first VFO segment or the first ID segment, it is possible to read the address identifiers from the second and third ID segments by opening the read gate in a period corresponding to the second VFO segment.

Other objects and further feature of the present invention will be apparent from the following detailed description when read in conjunction with the accompanying drawings.

DESCRIPTION OF THE PREFERRED EMBODIMENTS

Figure 1:
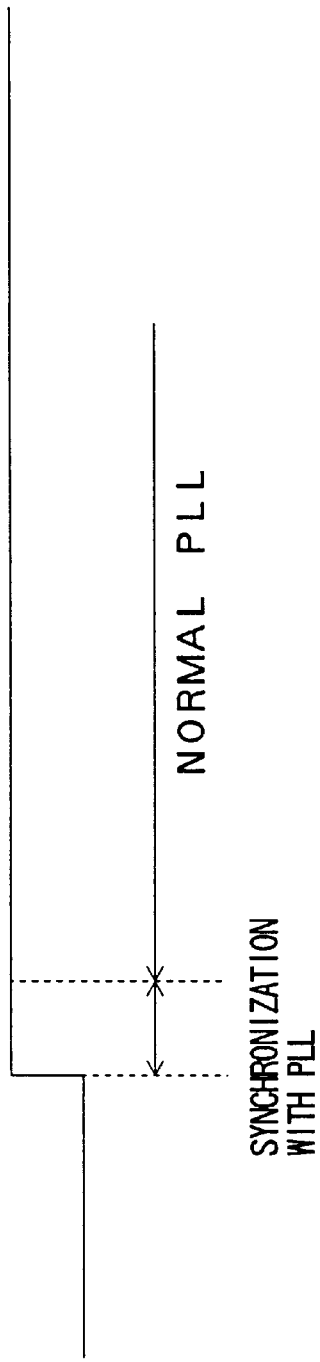
FIG. 1 is a diagram showing an open timing of a read gate in relation to a conventional format of an address area.
Figure 2:
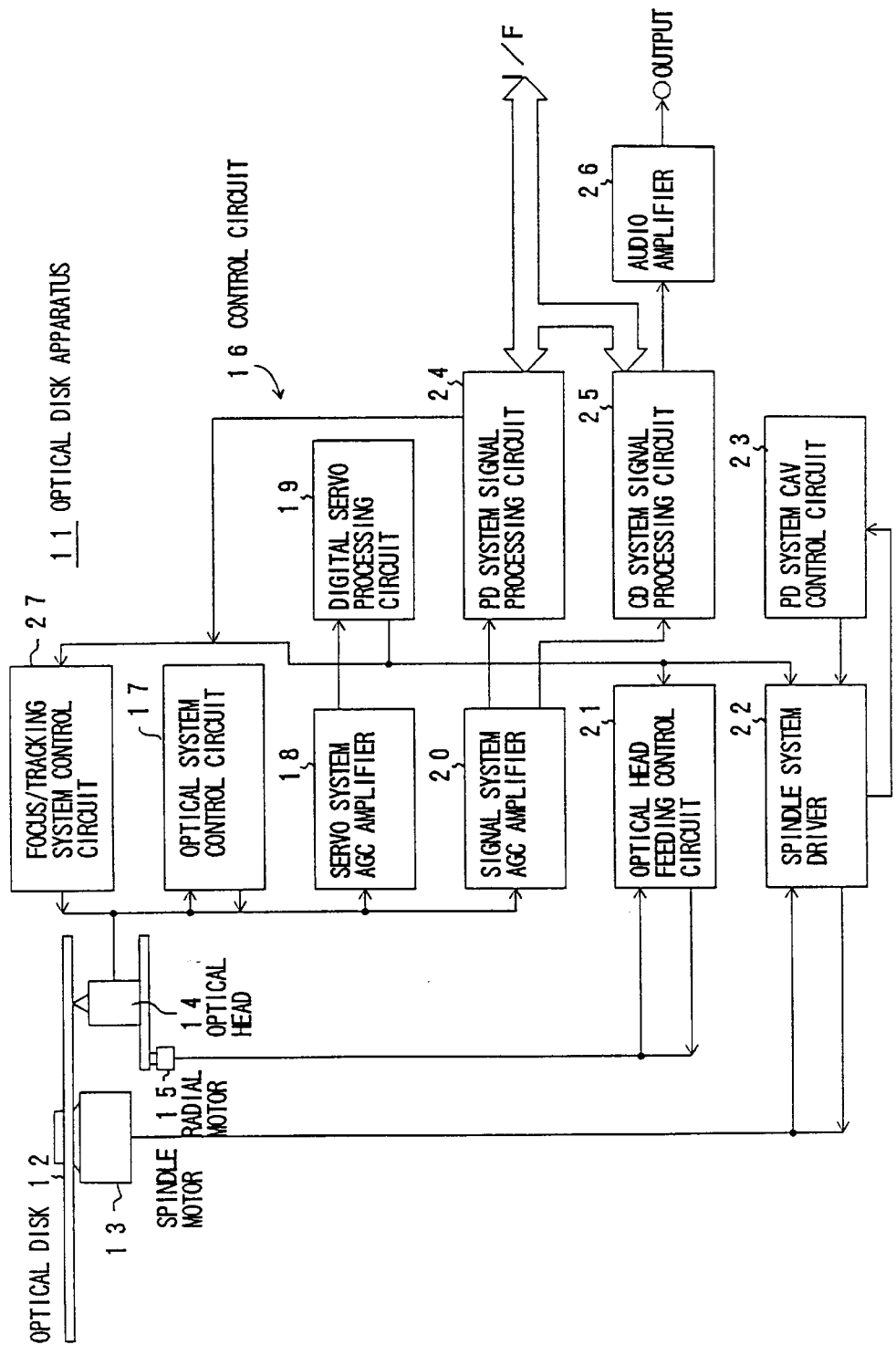
FIG. 2 is a block diagram showing an optical disk apparatus according to the present invention.

FIG. 2 is a block diagram of an optical disk apparatus according to the present invention. The optical disk apparatus 11 generally comprises a spindle motor 13 for rotating an optical disk 12, an optical head 14 for projecting laser light on a recording surface of the optical disk 12 to write information on the optical disk 12 or read out information from the optical disk 12, a radial motor 15 for actuating the optical head 14 in the radial direction of the disk, and a control circuit 16 for controlling the optical head 14 and the motors 13, 15.

The control circuit 16 consists of LSI circuits including an optical system control circuit 17 for controlling the intensity of laser light emitted by a laser diode which is provided on the optical head 14, a servo system AGC amplifier 18, a digital servo processing circuit 19, a signal system AGC amplifier 20, an optical head feeding control circuit 21 for controlling the radial motor 15, a spindle system driver 22 for controlling the spindle motor 13, a PD system CAV control circuit 23, a PD system signal processing circuit 24 for controlling recording and reproduction of PDs, a CD system signal processing circuit 25 for controlling recording and reproduction of CDs, an audio amplifier 26 for amplifying audio signals which have been reproduced from a CD, and a focus/tracking system control circuit 27.

When a CD or a CD-ROM is replayed, signals read out by the optical head 14 are amplified by the signal system AGC amplifier 20 and delivered to the CD system signal processing circuit 25. The CD system signal processing circuit 25 then performs signal processing such as EFM demodulation and error correction on the signals, and outputs the resultant signals via the audio amplifier 26 in the case of CDs or, in the case of CD-ROMs, directly to an interface circuit of a personal computer. While the CD system signal processing circuit 25 is performing the above signal processing, the spindle motor 13 is CLV (Constant Linear Velocity) controlled by the spindle system driver 22 to be actuated at a constant linear velocity.

When a PD is replayed, signals read out by the optical head 14 are amplified by the signal system AGC amplifier 20 and delivered to the PD system signal processing circuit 24. The PD system signal processing circuit 24 performs signal processing such as (2–7) demodulation on the signals, and outputs the resultant signals to the interface circuit. When a PD is recorded, the PD system signal processing circuit 24 performs signal processing such as (2–7) modulation on signals and delivers the resultant signals to the optical system control circuit 17. While the PD system signal processing circuit 24 is performing the above signal processing, the spindle motor 13 is ZCAV (Zone Constant Angular Velocity) controlled by the spindle system driver 22 and the PD system CAV control circuit 23 to rotate at a constant angular velocity.

Each of the PD system signal processing circuit 24 and the CD system signal processing circuit 25 is provided with a phase-locked loop (PLL). When the read-out synchronous signal (VFO) is read from a sector of the optical disk 12 by the optical head 14 and delivered to the PD system signal processing circuit 24 or the CD system signal processing circuit 25 via the signal system AGC amplifier 20, the PLL extracts clock pulses therefrom whose phase is synchronized with the readout synchronous signal (VFO).

Each of the PD system signal processing circuit 24 and the CD system signal processing circuit 25 is further provided with a sector mark detector for detecting the sector mark, a read gate controller for controlling a read gate to enable readout of information from the VFO segments, a PLL controller for initiating synchronization with the PLL in response to the opening of the read gate, and an address information detector for detecting the address identifiers, all of which are implemented as control programs. If the address information detector cannot detect any address identifier, the read gate controller closes the read gate and opens the read gate again at a timing corresponding to the VFO segment immediately after the ID segment in which the address identifier cannot be detected.

Now, descriptions will be given of a control operation for reading address identifiers for each of the sectors, which operation constitutes an essential part of the present invention.

Figure 3:
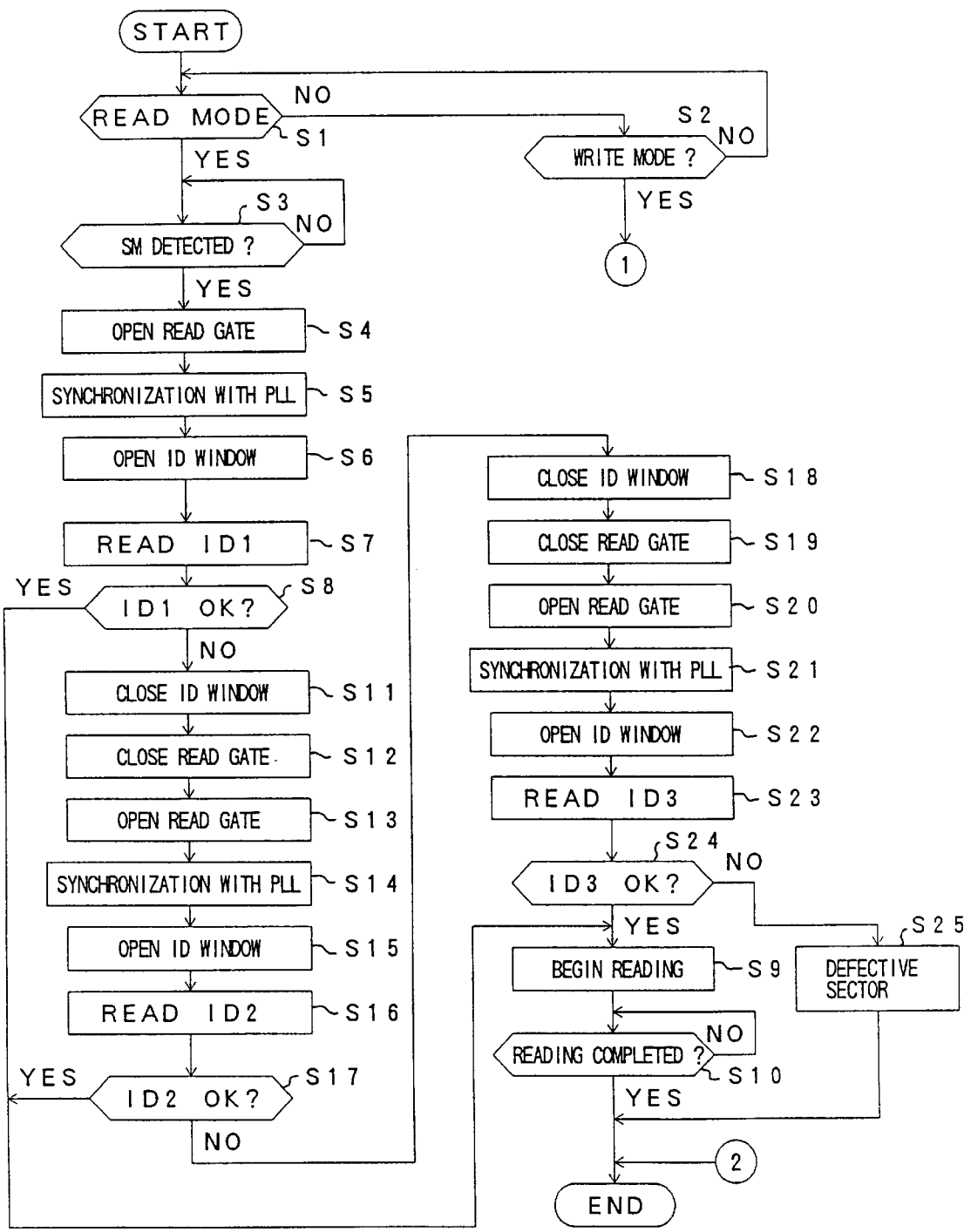
FIG. 3 is a flowchart of an example of a control operation for reading address identifiers.
Figure 4:
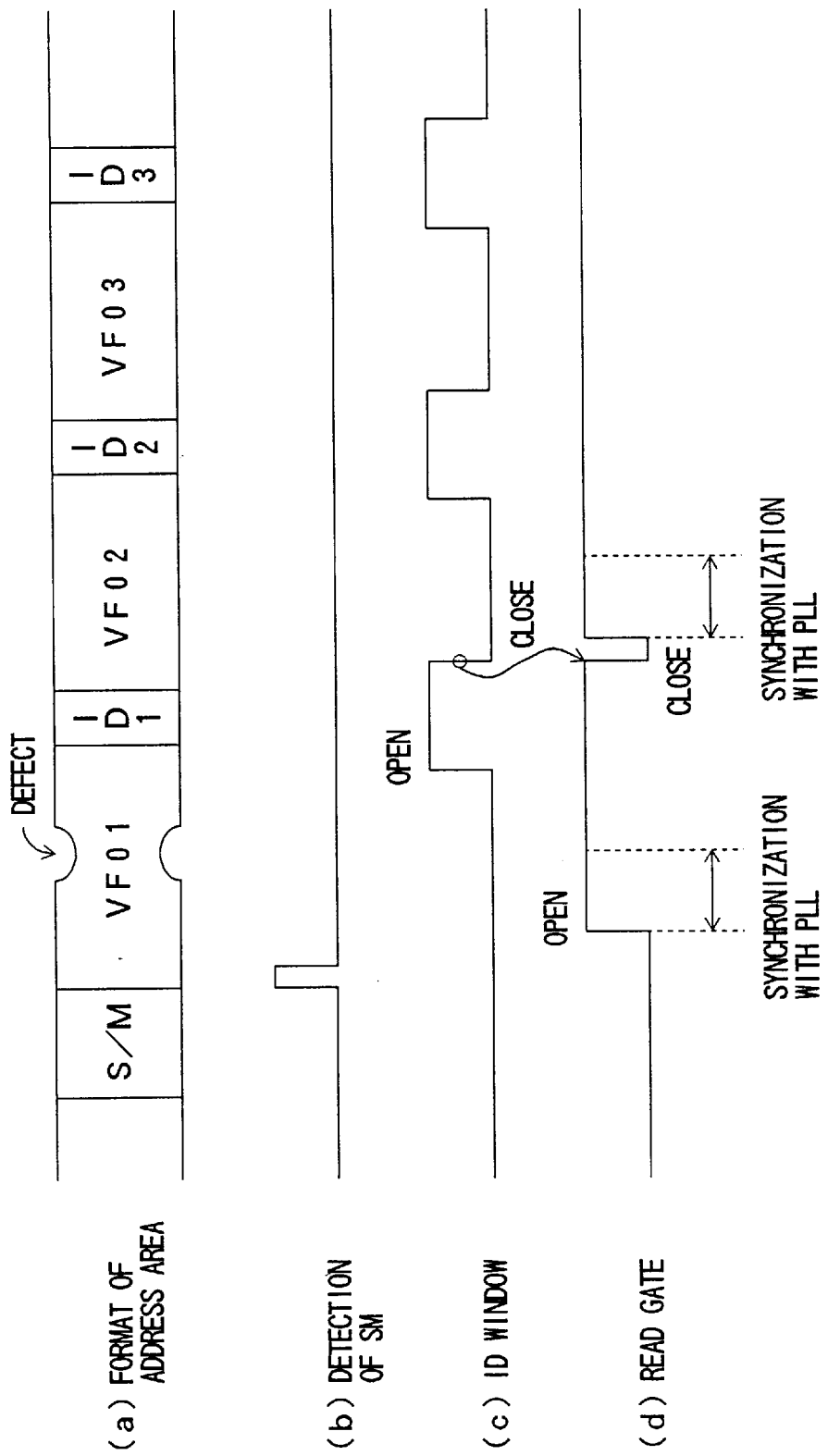
FIG. 4 is a diagram showing an open/close timing of an ID window and a read gate in relation to the format of the address area according to the present invention.

FIG. 3 is a flowchart illustrating an example of the control operation for reading the address identifiers performed by the PD system signal processing circuit 24 or the CD system signal processing circuit 25. FIG. 4 is a diagram illustrating an example of an open/close timing of the ID window and the read gate in relation to the format of the address area realized by the operation of FIG. 3.

In step S1 of FIG. 3, it is determined whether or not a read mode is selected. If the read mode is not selected, then in step S2, it is determined whether or not a write mode is selected. If the write mode is not selected in step S2, then it is again determined whether or not the read mode is selected in step S1. Thus, the above steps S1 and S2 are repeated until the read mode or the write mode is selected.

In the present embodiment, in the case of the read mode, readout of data from the recording area is enabled if any one of the three address identifiers (ID1 through ID3) has been correctly read. In the case of the write mode, writing of data to the recording area is enabled if at least two of the three address identifiers (ID1 through ID3) have been correctly read.

If it is determined that the read mode is selected in the above step S1, then in step S3, it is determined whether or not the sector mark (SM) has been detected by the optical head 14. If the sector mark (SM) has been detected, then in step S4, the read gate is opened. In the next step S5, the first readout synchronous signal (VFO1) is brought into synchronization with the phase-locked loop (PLL). In step S6, an ID window is opened, and then in step S7, the first address identifier (ID1) is read from the first ID segment.

In step S8, it is verified whether the first address identifier (ID1) has been correctly read. If it is verified that the first identifier (ID1) has been correctly read, then in step S9, data is read from the recording area. If it is determined that the readout has been completed in step S10, then the operation is finished.

If, in the above step S8, it is found that the first address identifier (ID1) has not been correctly read, then the ID window is closed in step S1. In the next step S12, the read gate is closed in response to the closing edge of the ID window. In step S13, the read gate is opened in correspondence to the second VFO segment, and then in step S14, the second readout synchronous signal (VFO2) is brought into synchronization with the phase-locked loop (PLL). In the next step S15, the ID window is opened, and then in step S16, the second address identifier (ID2) is read from the second ID segment.

In step S17, it is verified whether the second address identifier (ID2) has been correctly read. If it is verified that the second address identifier (ID2) has been correctly read, then the operations in the above steps S9 and S10 are executed.

As described above, even if there is a defect in the first VFO segment and thus the first readout synchronous signal (VFO1) cannot be correctly read, it is possible to bring the second readout synchronous signal (VFO2) into synchronization with the phase-locked loop (PLL) by opening the read gate in correspondence with the second VFO segment in the above steps S11 through S15. Thus, it is possible to read the second address identifier (ID2) so that data can be read from the recording area of the sector. Consequently, even if the first readout synchronous signal (VFO1) cannot be correctly read, the corresponding sector can be used, and as a result, the storage capacity of the optical disk 12 is not reduced because the sector is not regarded as a defective sector.

However, if it is found that the second address identifier (ID2) has not been correctly read in step S17, it is judged that the there is some defect in the second ID segment. In this case, the ID window is closed in step S18. In the next step S19, the read gate is closed in response to the closing edge of the ID window, and then in step S20, the read gate is opened in correspondence with the third VFO segment. In step S21, the third readout synchronous signal (VFO3) is brought into synchronization with the phase-locked loop (PLL), and in step S22, the ID window is opened. Then in step S23, the third address identifier (ID3) is read from the third ID segment.

In the next step S24, it is verified whether the third address identifier (ID3) has been correctly read. If it is verified that the third address identifier (ID3) has been correctly read, the operations in the above steps S9 and S10 are executed.

As described above, even if there are some defects in the first and second VFO segments and the first and second readout synchronous signals (VFO1 and VFO2) cannot be read, it is possible to bring the third readout synchronous signal (VFO3) into synchronization with the phase-locked loop (PLL) by opening the read gate in correspondence with the third VFO segment in the above steps S18 through S22. Thus, it is possible to read the third address identifier (ID3) so that data can be read from the recording area of the sector. Consequently, even if the first and second readout synchronous signals (VFO1 and VFO2) cannot be correctly read, the corresponding sector can be used, and as a result, the storage capacity of the optical disk 12 is not reduced because the sector is not regarded as a defective sector.

However, if it is found that the third address identifier (ID3) has not been correctly read in step S24, it is judged that there are defects in all of the ID segments. In this case, it is determined that the sector is a defective sector in step S25 and then the operation is finished.

Next, descriptions will be given of an operation performed when the write mode is selected with reference to FIG. 5.

Figure 5:
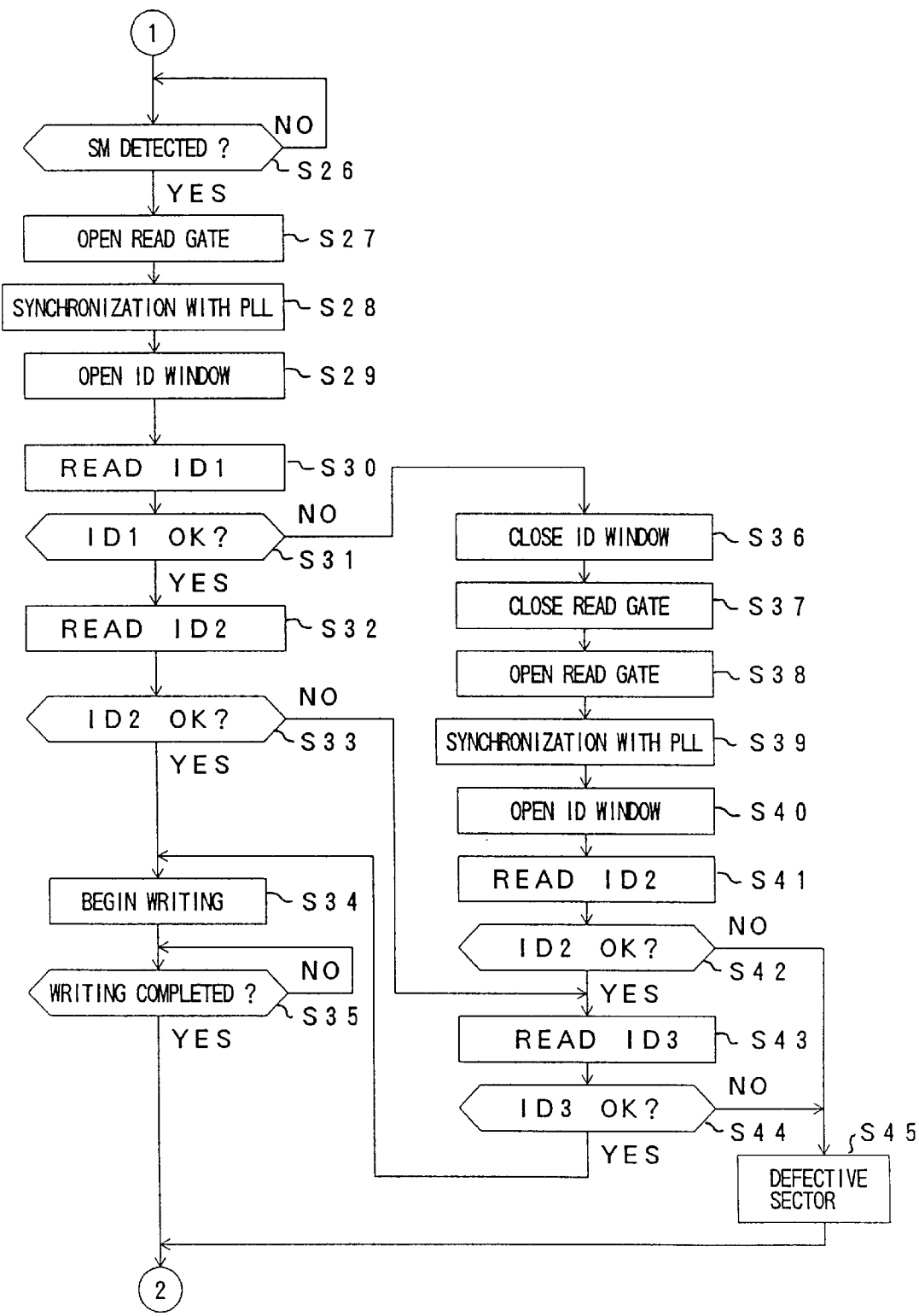
FIG. 5 is a flowchart of an operation performed in a write mode.

If it is determined that the write mode is selected in the above step S2 of FIG. 3, then in step S26 of FIG. 5, it is determined whether or not the sector mark (SM) has been detected by the optical head 14. If the sector mark (SM) has been detected, then in step S27, the read gate is opened. In the next step S28, the first readout synchronous signal (VFO) is brought into synchronization with the phase-locked loop (PLL), and in step S29, the ID window is opened. In step S30, the first address identifier (ID1) is read from the first ID segment.

In step S31, it is verified whether the first address identifier (ID1) has been correctly read. If it is verified that the first identifier (ID1) has been correctly read, then in step S32, the second address identifier (ID2) is read from the second ID segment.

In step S33, it is verified whether the second address identifier (ID2) has been correctly read. If it is verified that the second address identifier (ID2) has been correctly read, this means that both of the first and second address identifiers (ID1 and ID2) have been correctly read. In this case, data is written to the recording area in step S34, and if the writing has been completed in step S35, then the operation is finished.

On the other hand, if it is found that the first address identifier (ID1) has not been correctly read in the above step S31, it is judged that there is some defect in the first VFO segment or the first ID segment. In this case, the ID window is closed in step S36.

In the next step S37, the read gate is closed in response to the closing edge of the ID window. In step S38, the read gate is opened in correspondence with the second VFO segment, and then in step S39, the second readout synchronous signal (VFO2) is brought into synchronization with the phase-locked loop (PLL). In step S40, the ID window is opened, and then in step S41, the second address identifier (ID2) is read out from the second ID segment.

In the next step S42, it is verified whether the second address identifier (ID2) has been correctly read. If it is verified that the second address identifier (ID2) has been correctly read, then in step 43, the third address identifier (ID3) is read from the third ID segment. In step S44, it is verified whether the third address identifier (ID3) has been correctly read. If it is verified that the third address identifier (ID3) has been correctly read, this means that both of the second and third identifiers (ID2 and ID3) have been correctly read. In this case, data is written to the recording area in step 34. If the writing has been completed in step S35, then the operation is finished.

As described above, if the first readout synchronous signal (VFO1) cannot be correctly read, it is possible to bring the second readout synchronous signal (VFO2) into synchronization with the phase-locked loop (PLL) by opening the read gate in correspondence with the second VFO segment in the above steps S36 through S39. Thus, it is possible to read out the second and third address identifiers (ID2 and ID3) so that data can be written to the recording area. Consequently, if there is a defect in only the first VFO segment, the corresponding sector can be used, and as a result, the storage capacity of the optical disk 12 is not reduced because the sector is not regarded as a defective sector.

On the other hand, if it is found that the second address identifier (ID2) has not been correctly read in step S33, it is judged that there is some defect in the second VFO segment or the second ID segment. In this case, the third address identifier (ID3) is read from the third ID segment in step S43. If it is determined that the third address identifier (ID3) has been correctly read in step S44, this means that both of the first and third address identifiers (ID1 and ID3) have been correctly read. In this case, data is written to the recording area in step S34, and if the writing has been completed in step S35, the operation is finished.

If, in the above step S42, it is found that the second address identifier (ID2) has not been correctly read, this means that there are defects in the first and second VFO segments or the first and second ID segments. In this case, it is determined that the corresponding sector is a defective sector and then the operation is finished.

If, in the above step S44, it is determined that the third address identifier (ID3) has not been correctly read, this means that there are defects in the first (or second) and third VFO segments or the first (or second) and third ID segments. Thus, it is determined that the corresponding sector is a defective sector and then the operation is finished.

The application of the present invention is not limited to CD-ROM or PD disks but the present invention can also be applied to other types of optical disk apparatuses which perform recording or reproducing by means of laser light emitted from an optical head.

Further, the present invention is not limited to these embodiments, but variations and modifications may be made without departing from the scope of the present invention.

What is claimed is:

1. An optical disk apparatus for performing recording and reproduction of information on an optical disk having a sector format which consists of a sector mark area in which a sector mark is recorded and an address area in which a plurality of VFO segments and ID segments are alternately provided, comprising:

a sector mark detector which detects said sector mark;

a read gate controller which controls a read gate to be opened and closed, said read gate enabling readout of information from said VFO segment when said read gate is opened;

a PLL controller which initiates synchronization of a signal read from said VFO segment with a PLL in response to the opening of said read gate; and an address information detector which detects an address identifier recorded in said ID segment, and wherein, if said address information detector cannot detect said address identifier, said read gate controller closes said read gate and opens said read gate at a timing corresponding to said VFO segment located immediately after said ID segment in which said address identifier cannot be detected.

2. The optical disk apparatus as claimed in claim 1, wherein said read gate controller begins to control said read gate after said segment mark has been detected.

3. The optical disk apparatus as claimed in claim 2, wherein said address information detector includes an ID window controller which opens an ID window during a period corresponding to said ID segment of said address area, said ID window enabling the detection of said address identifier recorded in said ID segment when said ID window is opened.

4. The optical disk apparatus as claimed in claim 3, wherein said read gate controller closes said read gate in response to the closing edge of said ID window.

5. The optical disk apparatus as claimed in claim 2, wherein said address area comprises at least three pairs of mutually adjacent VFO segments and ID segments.

* * * * *